United States Patent
Kondo

(10) Patent No.: US 8,999,542 B2
(45) Date of Patent: Apr. 7, 2015

(54) ELECTRIC TOOLS

(71) Applicant: Makita Corporation, Anjo-shi (JP)

(72) Inventor: Eiji Kondo, Anjo (JP)

(73) Assignee: Makita Corporation, Aichi (JP)

( * ) Notice: Subject to any disclaimer, the term of this patent is extended or adjusted under 35 U.S.C. 154(b) by 0 days.

(21) Appl. No.: 13/782,583

(22) Filed: Mar. 1, 2013

(65) Prior Publication Data

US 2013/0177796 A1 Jul. 11, 2013

Related U.S. Application Data

(62) Division of application No. 12/320,971, filed on Feb. 10, 2009, now Pat. No. 8,415,046.

(30) Foreign Application Priority Data

Feb. 15, 2008 (JP) .................................. 2008-034514

(51) Int. Cl.
*H01M 2/10* (2006.01)
*B25B 21/00* (2006.01)
*B25F 5/02* (2006.01)

(52) U.S. Cl.
CPC ............... *H01M 2/1022* (2013.01); *B25F 5/02* (2013.01); *H01M 2/1055* (2013.01)

(58) Field of Classification Search
None
See application file for complete search history.

(56) References Cited

U.S. PATENT DOCUMENTS

| | | | |
|---|---|---|---|
| 5,769,657 A * | 6/1998 | Kondo et al. | 439/500 |
| 2006/0222930 A1 | 10/2006 | Aradachi et al. | |
| 2008/0187822 A1 | 8/2008 | Breitenbach | |
| 2008/0196553 A1 * | 8/2008 | Hoffmann et al. | 81/54 |

FOREIGN PATENT DOCUMENTS

| | | |
|---|---|---|
| DE | 10 2005 036 448 A1 | 2/2007 |
| DE | 10 2005 036 449 A1 | 2/2007 |
| EP | 1 205 282 A2 | 5/2002 |
| GB | 2 449 254 A | 11/2008 |
| JP | A-2006-155989 | 6/2006 |
| JP | A-2008-270007 | 11/2008 |
| WO | WO 2004/023582 A2 | 3/2004 |
| WO | WO 2007014877 A1 * | 2/2007 |

OTHER PUBLICATIONS

Extended European Search Report dated Mar. 18, 2013 in European Application No. EP 13155853.8.
Extended European Search Report dated Mar. 22, 2013 in European Application No. EP 13155845.4.
Machine translation in English of DE 10 2005 036 449.
European Search Report mailed Jun. 8, 2009 in EP 09002033.0.
Translation of Nov. 28, 2014 Office Action issued in European Application No. 13 155 853.8.

* cited by examiner

*Primary Examiner* — Barbara Gilliam
*Assistant Examiner* — Stephan Essex
(74) *Attorney, Agent, or Firm* — Oliff PLC

(57) ABSTRACT

A battery housing portion S includes regulating members 30 adapted to fit grooves of a battery pack having a T-shape cross section, so that the battery pack can be housed in the battery housing portion S in the state that the both regulating members 30 fit the grooves. The regulating members 30 regulate housing orientation of the battery pack 20, so that misjudgment about orientation of the battery pack 20 is prevented. In addition, if the orientation has been misjudged, an operator can notice such misjudgment immediately, thereby improving the operability during mounting the battery pack 20.

2 Claims, 4 Drawing Sheets

ELECTRIC TOOLS

This is a Division of application Ser. No. 12/320,971 filed Feb. 10, 2009. The disclosure of the prior application is hereby incorporated by reference herein in its entirety.

This application claims priority to Japanese Patent Application Serial Number 2008-34514, the contents of which are incorporated herein by reference.

BACKGROUND OF THE INVENTION

The present invention relates to electric tools powered by battery packs.

Recently, various electric tools powered by a DC power source (or battery packs), not having an AC power source, have been used in tools (e.g., building operations of houses and including cutting tools, such as circular saws, drills for boring and electric screwdrivers. For example, electric screwdrivers have included a battery pack housed in a battery housing portion, which is formed in a handle protruding laterally from a side surface of a tool body. In general, the battery pack is repeatedly used by being detached and recharged.

The battery pack generally includes a plurality of cylindrical battery cells received within a battery case. Positive and negative electric contacts and claws for engaging with the tool body are provided at an outer surface of the battery case. Known battery packs generally include two or three battery cells.

DE 10 2005 036 449 A1 discloses a technique relating to a locking mechanism for fixing a battery pack within a battery housing portion formed in a handle, where the battery pack includes three battery cells arranged in a substantially T-shape manner in a cross section.

However, in a case of the battery pack including three battery cells arranged in a substantially T-shape manner not in line, since its cross sectional shape is more similar to a circle than that of a battery pack with two battery cells, an operator is likely to select a wrong orientation for housing the battery pack when inserting the battery pack into a battery housing portion. In this context, the orientation for housing the battery pack (also, referred to as a housing orientation) means an orientation about an axis along an inserting direction of the battery (i.e., a depthwise direction of the battery housing portion). Accordingly, in the case of the battery pack with two cells, the possibility of correct orientation is one half, whereas in the case of the battery pack with three cells, it is one third, so that the operator is more likely to select its wrong orientation.

If the battery pack has been partly inserted into the battery housing portion in a wrong orientation, the battery pack should be pulled out from the battery housing portion, turned to the correct orientation and inserted into the battery housing portion again, resulting in diminished user efficiency.

Therefore, there has been a need for battery-powered tools that are improved in operability for mounting a battery pack into a battery housing portion and having a T-shape cross section.

SUMMARY OF THE INVENTION

In accordance with the present invention, battery pack, which has a T-shape cross section since, e.g., three battery cells are housed in the battery pack in T-shape manner, can be quickly mounted into the battery housing portion without selecting wrong orientation. That is, a pair of grooves each defining a substantially right-angular corner in cross section is formed at a side surface. A pair of regulating members corresponding to the grooves for regulating the housing orientation is provided inside of the battery housing portion in the tool body. The regulating members of the tool body fit the grooves of the battery pack when mounting the battery pack into the battery housing portion of the tool body in the correct orientation, whereas if an operator intends to insert the battery pack into the battery housing portion in wrong orientation, the battery pack hits the regulating member and is prevented from inserting into the battery housing portion, so that the battery pack cannot be mounted in the wrong orientation. Therefore, the orientation of the battery pack with the T-shape cross section is regulated to a predetermined orientation.

In this way, according to one embodiment of the present invention, the orientation insertable into the battery housing portion of the tool body (that is, correct housing orientation) is regulated to one orientation, so that it is possible to mount the battery pack without selecting wrong orientation, thereby improving the operability when mounting the battery pack.

With respect to the battery pack with the T-shape cross section, various modifications can be envisioned. For example, a battery pack can have three battery cells in T-shape manner, two parallel battery cells and a dummy member disposed in front of the battery cells, or three parallel battery cells arranged in line and another battery cells disposed in front of the battery cells. Accordingly, it is possible to generally adopt such T-shape cross-sectional configuration independently of the number of the housed battery cells.

In another embodiment, a stepped positioning convex portion formed on an end of the battery pack engages with a positioning concave portion formed on a bottom portion of the battery housing portion in the state that the battery pack is housed in the battery housing portion (i.e., mounting state) in order to non-movably fix the battery pack in the housing portion. Throughout the specification, the bottom portion of the battery housing portion is the area of the battery housing portion that is located above the positioning convex portion of the battery pack when the battery pack is inserted in the battery housing portion.

In a further embodiment, the regulating members are provided a part of the length between an open end and the bottom portion of the battery housing portion, and are not provided within a certain distance from the open end. Therefore, there are spaces between the battery pack and the battery housing portion in the mounting state, in addition engaging members are provided with the battery housing portion such that the engaging members protrude into said spaces. The engaging members are adapted to engage with fixing claws mounted on the battery pack in order to fix the battery pack in the battery housing portion. Since each of the engaging members is positioned close to the corresponding end portion of the regulating members, it is possible to compactly dispose the engaging members in such small space, thereby minimizing the size of the handle.

DETAILED DESCRIPTION OF THE INVENTION

Each of the additional features and teachings disclosed above and below may be utilized separately or in conjunction with other features and teachings to provide battery-powered electric tools. Representative examples of the present invention, which examples utilized many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
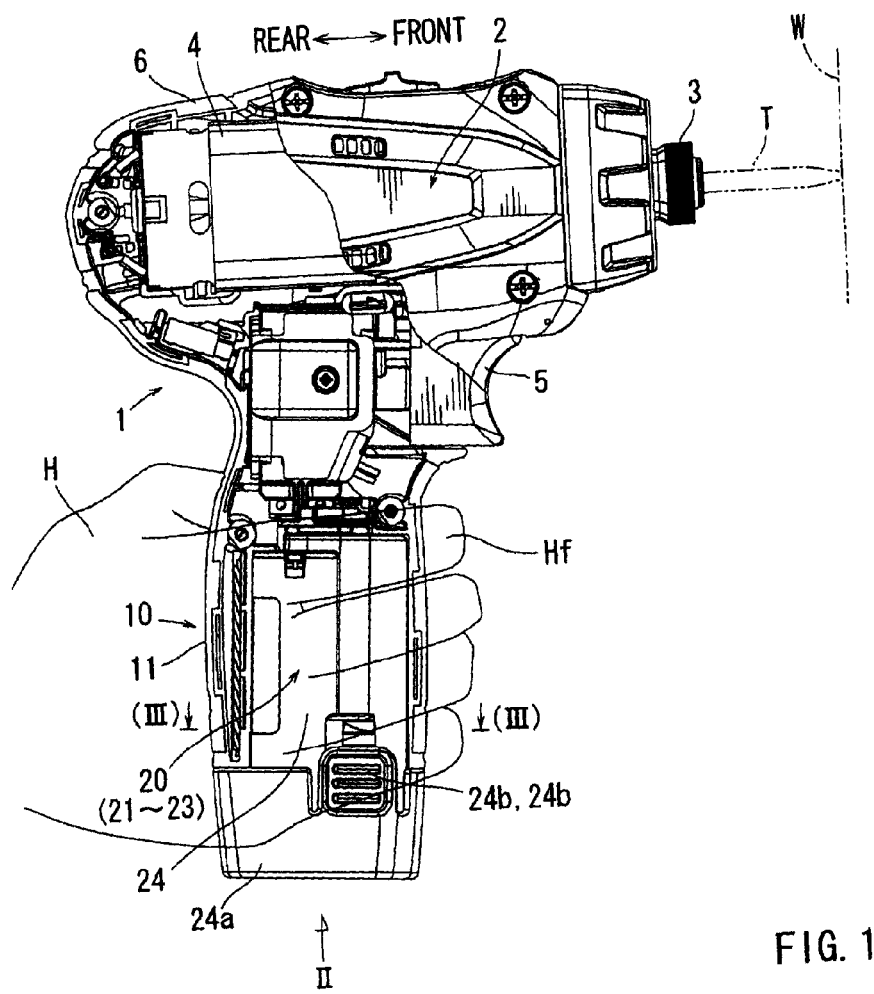
FIG. 1 is a side view of the electric tool according to an embodiment of the present invention, where inner structures of the rear section of the tool body and the handle are illustrated.

A first embodiment will be described in reference to FIGS. 1-6. FIG. 1 shows a whole structure of an electric tool 1 powered by a battery pack according to the first embodiment. In this embodiment, the electric tool 1 is configured as a relatively small drill for boring. With respect to a direction of members or portions, a side toward which a boring bit advances (right side in FIG. 1), is referred to as a front side or a front end side, whereas an opposite side is referred to as a rear side hereafter. During the operation of the electric tool 1, an operator may be positioned on the rear side of the electric tool 1.

This electric tool 1 includes a substantially cylindrical tool body 2. A handle 10 protrudes from a lateral side of the tool body 2. A housing 6 of the tool body 2 and a handle body 11 of the handle 10 can be integrally formed. The operator can grip the handle 10 with one hand H.

A chuck 3 for mounting a tool bit T is provided on a front end of the tool body 2 (right end in FIG. 1). By pressing the tool bit T against a workpiece W, the workpiece W is bored. An electric motor 4 is housed in the tool body 2. The tool bit T is driven about its axis by the electric motor 4 serving as a drive source. A trigger-type switch lever 5 is disposed at a front side of a base portion of the handle 10. When the switch lever 5 is pressed by fingers Hf of the hand H gripping the handle 10, the electric motor 4 is started.

The handle 10 has a diameter and a cross sectional configuration suitable for easily gripping the handle 10 with the single hand H. A rechargeable battery pack 20 is provided at an end portion (lower end portion in FIG. 1) of the handle 10 (more specifically, the handle body 11). The exemplary electric tool 1 utilizes the battery pack 20 as a power source. That is, the electric motor 4 is driven by the battery pack 20 as a power source.

Figure 3:
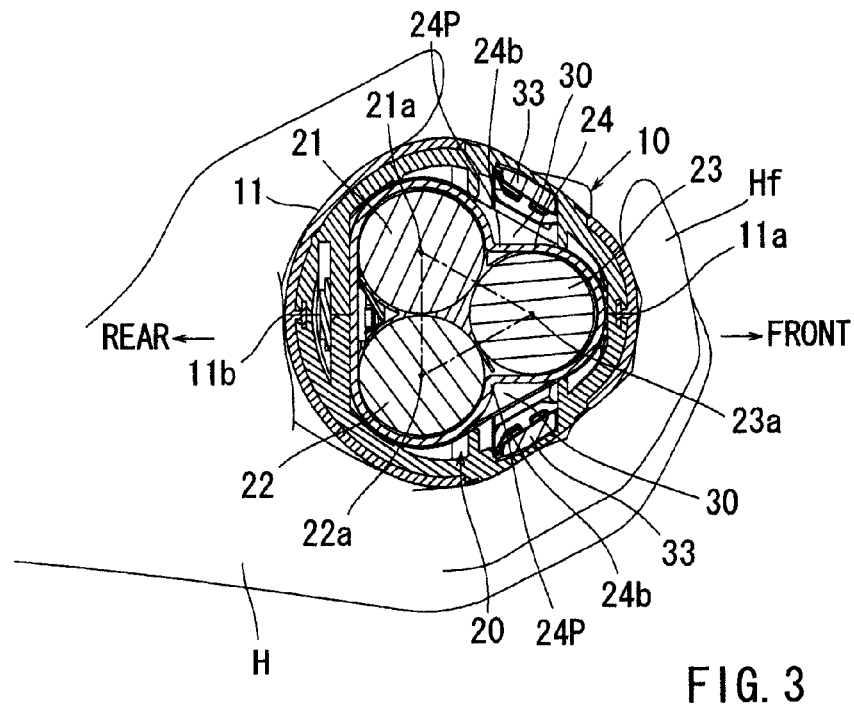
FIG. 3 is a cross sectional view of the handle with the battery pack along a line (III)-(III) in FIG. 1, where the handle is grasped by a hand.

The battery pack 20 is configured to have three battery cells 21, 22 and 23 mounted within a battery case 24 as shown in FIG. 3. The battery cells 21-23 are each formed to have a cylindrical shape, and are arranged such that longitudinal axes of the battery cells 21-23 extend parallel to each other and positioned at vertexes of a triangle (in a T-shape manner) not in line. This arrangement will be hereinafter also referred to as a T-shape arrangement. The battery cells 21-23 in this embodiment are positioned such that central axis 21a-23a of the battery cells 21-23 are positioned at vertexes of the triangle as shown in FIG. 3. In this T-shape arrangement, two battery cells 21 and 22 are disposed parallel to each other on the rear side of the other battery cell 23 such that all battery cells 21-23 are in close proximity with each other.

Since three battery cells 21-23 are arranged in a T-shape manner, the battery case 24 is formed to have a substantially T-shape cross section corresponding to the arrangement of the battery cells 21-23. The battery case 24 has a rear section 24Y with an oval cross section in plan view for housing two battery cells 21 and 22 disposed parallel to each other, and a front section 24T with a semi-oval cross section for housing the battery cell 23 positioned on the front side. A direction along a major axis of the oval cross section of the front section 24T is parallel to a longitudinal direction of the tool body 2, whereas a direction along a major axis of the oval cross section of the rear section 24Y is perpendicular to the longitudinal direction of the tool body 2. Major axis directions of the front section 24T and the rear section 24Y are perpendicular to each other, so that the battery case 24 has a substantially T-shape cross section.

The battery case 24 has a pair of right and left side grooves 24P each defining a substantially right-angular corner in cross section at positions where the front section 24T and the rear section 24Y intersect with each other.

Figure 4:
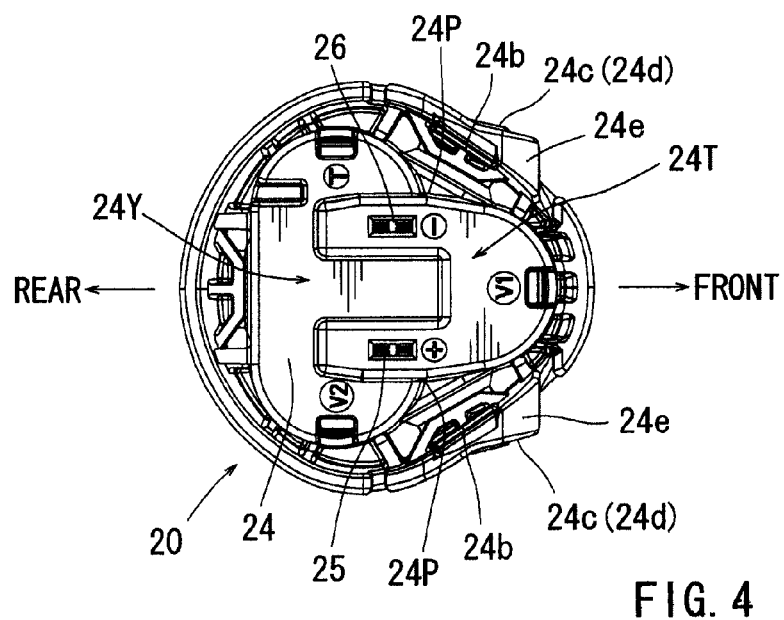
FIG. 4 is a top view of the battery pack.
Figure 5:
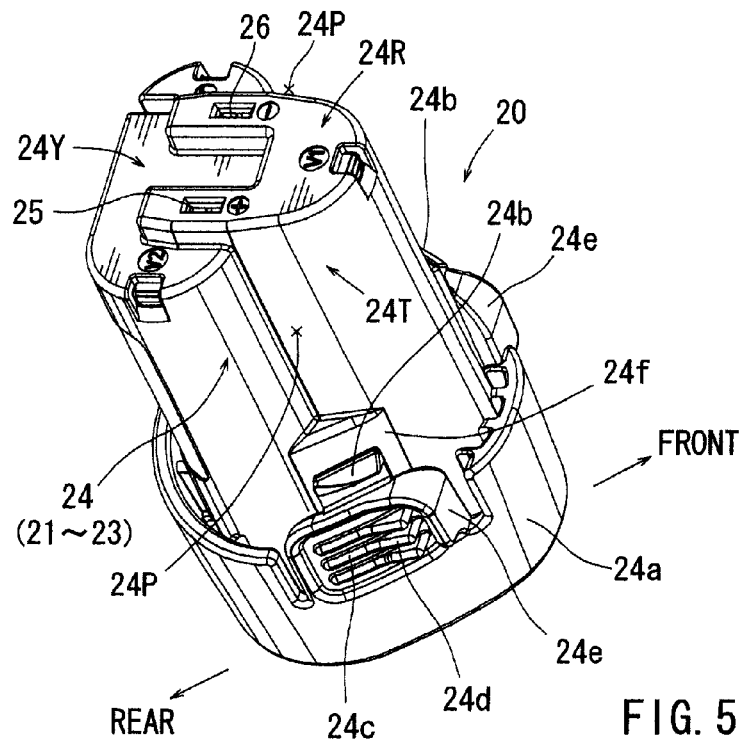
FIG. 5 is a perspective view of the battery pack and the cap.

In addition, a portion of the front section 24T protrudes upward beyond top surface of the rear section 24Y in a longitudinal direction as shown in FIG. 5. The protruding portion of the front section 24T serves as a positioning convex portion 24R for positioning the battery case 24 relative to a battery housing portion S of the handle body 11. The positioning convex portion 24R has a bifurcated configuration (U-shape) in cross section as shown in FIGS. 4 and 5. A positive terminal connecting port 25 and a negative terminal connecting port 26 for receiving a positive terminal 31 and a negative terminal 32 of the battery housing portion S, respectively, are formed on respective branches of the convex portion 24R.

A cap 24a is provided at a bottom end of the battery case 24 as shown in FIGS. 1 and 5. In the state that the battery pack 20 is attached to the handle 10, the cap 24a covers an inner space (battery housing portion S) of the handle body 11.

A pair of mounts 24f is disposed at lower portions of the grooves 24P. Each mount 24f has a substantially triangle pole shape and is formed to fit corresponding one of the grooves 24P having the substantially right-angular corner in cross section. A fixing claw 24b is mounted on each of the mounts 24f and is biased to extend outwardly from a side surface of the corresponding mount 24f due to own elastic force.

Both fixing claws 24b are biased to extend outwardly (toward a lock position) due to the biasing forces of said springs and engage with the handle body 11 in order to maintain a mounting condition of the battery pack 20. When the fixing claws 24b are displaced inwardly (toward an unlock position) against the biasing forces, engagement between the battery pack 20 and the handle body 11 is released, so that the battery pack 20 can be removed from the handle body 11, and can be recharged or replaced with another battery pack.

The cap 24a includes release members 24c disposed at right and left side surfaces to correspond to the right and left fixing claws 24b, respectively. When the release members 24c are pressed by fingers, the fixing claws 24b are displaced to the unlock position against the biasing forces. When the pressing forces applied to the release members 24c are released, the fixing claws 24b return to the lock position due to the biasing forces.

Each of the release members 24c is formed integrally with a slip-preventing member 24d. More specifically, each of the release members 24c includes three horizontal ribs that are arranged parallel to each other. The slip-preventing member 24d is formed by front parts of the ribs protruding outwardly and each having an end surface curved in a V-shape manner for contacting with the fingers. The slip-preventing members 24d are disposed substantially parallel to each other and substantially perpendicular to a direction for pressing by fingers. The slip-preventing members 24d prevent the fingers from sliding toward a vertex portion 11a (that is, front side) in order to ensure that the release members 24c can be pressed, thereby improving the operability of the battery pack 20.

Guard members 24e are disposed to surround the slip-preventing members 24d, respectively and protrude outwardly by the substantially same distance as the protruding distance of the corresponding slip-preventing members 24d. The guard members 24e can prevent unintended pressing operation of the release members 24c (or the slip-preventing members 24d).

In addition, the release members 24c are disposed along the two sides of the triangular cross sectional, so that the release members 24c are inclined relative to each other in directions toward the vertex portion 11a of the handle body 11. Accordingly, in the case that the operator presses both release members 24c by, e.g., a first finger and a second finger from both sides, since the release members 24c are not perpendicular to each other but are inclined by a large angle relative to a pressing direction, the fingers may slip toward the vertex portion 11a along the release members 24c and it may be difficult to reliably press the release members 24c. However, in this embodiment, the slip-preventing members 24d are provided at the outer portions of the release members 24c, respectively. The slip-preventing members 24d can prevent the fingers from slipping toward the vertex portion 11a, so that the operator can certainly press the release members 24c and that the operability of the battery pack 20 is improved.

In this way, since the three battery cells 21-23 are arranged in a T-shape manner, the battery housing portion S also has a substantially T-shape cross section to correspond to the battery case 24 and thus the battery pack 20 with T-shape cross section due to the arrangement. In accordance with this embodiment, the battery pack 20 is inserted into the battery housing portion S of the handle body 11 such that the front section 24T is positioned at the front side and the rear section 24Y is positioned at the rear side. Accordingly, the handle body 11 has a substantially triangle cross section, where the vertex portion 11a with a large curvature is positioned at the front side and a bottom side portion 11b with a smaller curvature is positioned at the rear side. In accordance with the handle 10 having said triangle cross section, if the operator grips the handle 10, the fingertips of the hand of the operator may bear against the vertex portion 11a at the front side, whereas the palm of the hand may bear against the bottom side portion 11b at the rear side, so that it is possible to easily grip the handle 10 compared with the case where the arrangement of the vertex portion 11a and the base 11b is reversed.

Figure 2:
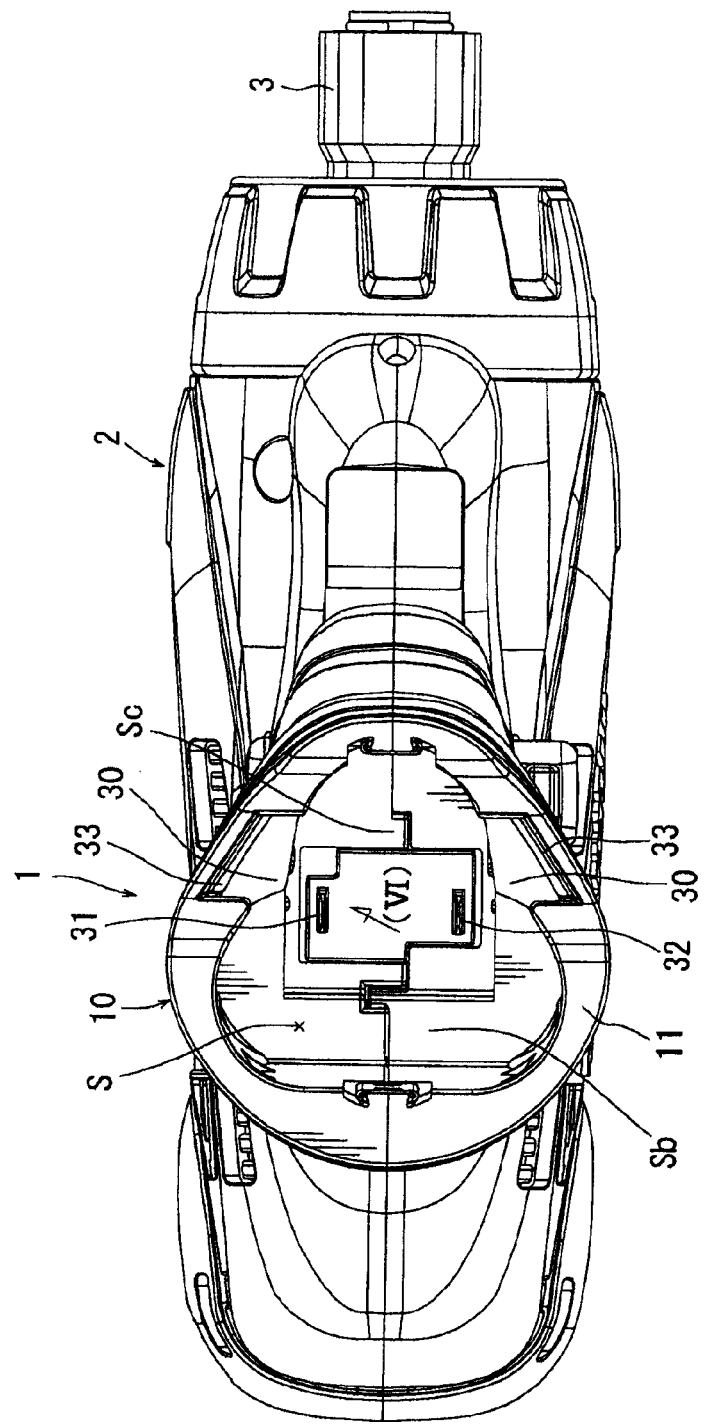
FIG. 2 is a bottom view of the electric tool viewed from a direction indicated by an arrow (II) in FIG. 1, where the battery pack is removed from the battery housing portion.
Figure 6:
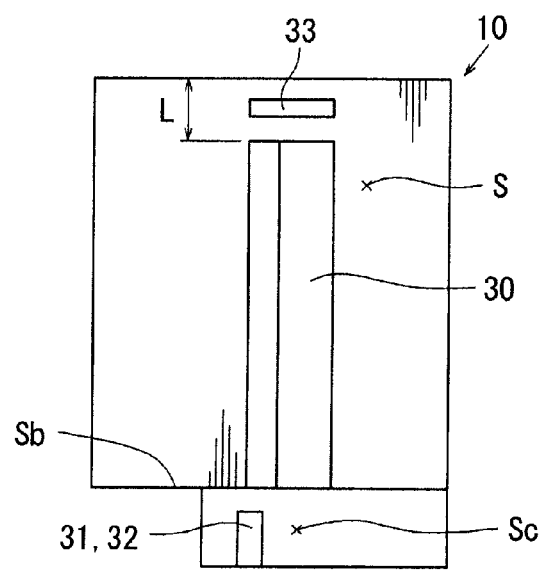
FIG. 6 is a side view of the regulating member and the engaging member viewed from a direction indicated by an arrow (VI), and shows an upside-down view of the battery housing portion S illustrated in FIG. 1.

The battery housing portion S includes regulating members 30 that can regulate the orientation of the battery pack 20 adapted to be fitted into the grooves 24P of the battery pack 20 for regulating the orientation of the battery pack 20 as shown in FIG. 2. Each of the regulating members 30 has a triangular cross section that is substantially the same as the cross section of each of the mounts 24f of the battery pack. Therefore, when the battery pack 20 is inserted into the battery housing portion S, the regulating members 30 fit into the grooves 24P and adjoin the mounts 24f. To this end, the regulating members 30 extend from a position, which is spaced by a distance L (for receiving the mount 24O away from an open end of the battery housing portion S, to a bottom portion Sb of the battery hosing portion S as shown in FIG. 6.

Engaging members 33 for engaging with the fixing claws 24b of the battery pack 20 are provided on the battery housing portion S and are positioned on the side of the open end with respect to the regulating members 30.

A positioning concave portion Sc is formed on the bottom portion Sb of the battery housing portion S. The positioning concave portion Sc has a semi-oval configuration in plan view and is capable of non-movably receiving an end (positioning convex portion 24R) of the front section 24T of the battery pack 20. A positive terminal 31 and a negative terminal 32 are disposed at a bottom portion of the positioning concave portion Sc. When the positive terminal 31 is connected to the positive terminal connecting port 25 and the negative terminal 32 is connected to the negative terminal connecting port 26, the battery pack 20 is electrically connected to a power source circuit of the tool body 2 in order to supply electric power.

In accordance with the electric tool 1 of this embodiment described above, due to the arrangement where three battery cells 21-23 are disposed in the T-shape manner, it is possible to quickly mount the battery pack 20 having the T-shape cross section without selecting the wrong orientation. That is, the grooves 24P each having a right-angled corner in the cross section are formed on the right and left sides of the battery pack 20 with the T-shape cross section. A pair of the regulating members 30 corresponding to the grooves 24P is provided on the battery housing portion S of the handle 10. In mounting the battery pack 20 to the battery housing portion S, the regulating members 30 fit into the grooves 24P of the battery pack 20, so that the orientation of the battery pack 20 with the T-shape cross section is regulated to one direction where the front section 24T is positioned at the front side.

In this way, according to the electric tool 1 of this embodiment, the insertable orientation into the battery housing portion S of the battery pack 20 with the T-shape cross section (that is, correct orientation) is only one orientation facing forward, so that misjudgment of the orientation is prevented. In addition, if the wrong orientation has been selected, the battery pack 20 hits one of the regulating member 30 when inserting the battery pack 20 into the battery housing portion S, so that the operator can immediately notice such misjudge and insert the battery pack 20 in correct manner, thereby improving the operability during mounting of the battery pack 20.

According to the battery pack 20 exemplified, the positioning convex portion 24R is formed at the front end with respect to the insertion direction of the battery pack 20 by a portion of the front section 24T protruding beyond the rear section 24Y. The positioning convex portion 24R closely fits into the positioning concave portion Sc formed on the bottom portion of the battery housing portion S in order to non-movably fix the battery pack 20 in position in the mounted state.

Furthermore, the regulating members 30 are provided along a part of the length between the open end and the bottom portion Sb of the battery housing portion S, and end at a distance L from the open end of the battery housing portion S. Accordingly, there are spaces between the battery pack 20 and the battery housing portion S in the state that the battery pack 20 is mounted in the battery housing portion S, and the spaces are positioned between each corresponding end portion (upper ends in FIG. 6) of the regulating members 30 and the open end of the battery housing portion S. The engaging members 33 can be positioned within these spaces. In this way, the engaging members 33 engaged with the fixing claws 24b of the battery pack 20 for fixing the battery pack 20 within the battery housing portion S can be disposed parallel to the end portions of the regulating members 30, and the engaging members 33 can be disposed compactly by using the above spaces that are small in size, thereby minimizing the size of the handle and facilitating gripping of the handle.

Various modifications can be made to the embodiment described above. For example, although the battery pack 20 with the T-shape cross section where three battery cells 21-23 are arranged parallel to each other in T-shape manner, battery packs having T-shape cross sections and including four or more battery cells can be used. For example, a battery pack having a T-shape cross section and including one battery cell disposed at the front section and three parallel battery cells disposed at the rear section or a battery pack having a T-shape cross section and including two parallel battery cells disposed at the front section and two parallel battery cells disposed at the rear section can be also used.

In addition, it is possible to use a battery pack having a T-shape cross section and including at least one battery cell in one of the front section and the rear section and including no battery cell in the other. Therefore, the present invention can be applied to a battery pack with only one battery cell.

Furthermore, although the battery pack 20 mounted in the state that the front section 24T is positioned at the front side is exemplified, it is only necessary to regulate this orientation to one direction by the regulating members, therefore the housing orientation of the battery pack 20 can be set to a desired orientation (e.g., an orientation facing forward, backward or laterally).

Although the boring tool (so-called electric drill) is exemplified as the electric tool, the present invention can be applied to other electric tools, such as screwdrivers, cutting tools, hammering devices, or lighting devices.

What is claimed is:

1. An electric tool comprising:
  a first battery cell and a second battery cell that extend in a vertical direction and are arranged adjacent to each other in a right-left direction;
  a third battery cell extending in the vertical direction and being disposed in front of the first battery cell and the second battery cell;
  a battery case housing the first, second and third battery cells;
  a positive terminal connecting port and a negative terminal connecting port that are disposed on an upper end of the battery case;
  a battery pack configured to have the first, second and third battery cells mounted within the battery case and having a first fixing claw disposed on a left side of the battery pack;
  a handle body housing at least part of the battery pack and engaging with the first fixing claw;
  a tool body being connected with the handle body and housing an electric motor;
  wherein the battery pack has a second fixing claw disposed on a right side of the battery pack;
  the first fixing claw is aligned on a plane substantially parallel to a plane through an axis of the first battery cell and the axis of the third battery cell; and
  the second fixing claw is aligned on a plane substantially parallel to a plane through an axis of the second battery cell and the axis of the third battery cell.

2. A battery pack comprising:
  a first battery cell and a second battery cell that extend in a vertical direction and are arranged adjacent to each other in a right-left direction;
  a third battery cell extending in the vertical direction and being disposed in front of the first battery cell and the second battery cell;
  a battery case housing the first, second and third battery cells;
  a positive terminal connecting port and a negative terminal connecting port that are disposed on an upper end of the battery case;
  a first fixing claw disposed on a left side of the battery pack; and
  a second fixing claw disposed on a right side of the battery pack;
  wherein the first fixing claw is aligned on a plane substantially parallel to a plane through an axis of the first battery cell and the axis of the third battery cell; and
  the second fixing claw is aligned on a plane substantially parallel to a plane through an axis of the second battery cell and the axis of the third battery cell.

* * * * *